US009582859B2

(12) United States Patent
Domanski et al.

(10) Patent No.: US 9,582,859 B2
(45) Date of Patent: Feb. 28, 2017

(54) SYSTEM AND A METHOD FOR DEPTH-IMAGE-BASED RENDERING

(71) Applicant: Politechnika Poznanska, Poznan (PL)

(72) Inventors: Marek Domanski, Poznan (PL); Tomasz Grajek, Poznan (PL); Damian Karwowski, Poznan (PL); Krzysztof Klimaszewski, Murowana Goslina (PL); Olgierd Stankiewicz, Poznan (PL); Jakub Stankowski, Poznan (PL); Krzysztof Wegner, Murowana Goslina (PL)

(73) Assignee: POLITECHNIKA POZNANSKA, Poznan (PL)

( * ) Notice: Subject to any disclaimer, the term of this patent is extended or adjusted under 35 U.S.C. 154(b) by 72 days.

(21) Appl. No.: 14/753,015

(22) Filed: Jun. 29, 2015

(65) Prior Publication Data
US 2016/0379341 A1 Dec. 29, 2016

(30) Foreign Application Priority Data

Jun. 24, 2015 (PL) .................................... PL412832

(51) Int. Cl.
*G06K 9/00* (2006.01)
*G06T 5/00* (2006.01)
*G06T 15/00* (2011.01)
*G06T 7/00* (2006.01)

(52) U.S. Cl.
CPC ............. *G06T 5/002* (2013.01); *G06T 7/0075* (2013.01); *G06T 15/00* (2013.01); *G06T 2207/10012* (2013.01)

(58) Field of Classification Search
CPC ........... G06T 2207/10028; G06T 15/00; G06T 2200/04; G06T 2207/10012
USPC 382/128, 154, 171, 190, 260, 275; 128/922, 923
See application file for complete search history.

(56) References Cited

U.S. PATENT DOCUMENTS

| | | | | |
|---|---|---|---|---|
| 7,226,797 B2 * | 6/2007 | Tong | ..................... | G06T 7/0004 438/401 |
| 8,260,074 B2 * | 9/2012 | Lin | ....................... | G06T 7/0069 382/167 |
| 8,548,227 B2 * | 10/2013 | Panahpour Tehrani | ................. | G06T 15/205 345/426 |
| 8,643,701 B2 * | 2/2014 | Nguyen | ............... | H04N 13/025 348/47 |
| 8,744,167 B2 * | 6/2014 | Kang | ..................... | G06T 5/002 348/42 |
| 8,774,512 B2 * | 7/2014 | Yao | ....................... | G06T 7/0081 382/154 |

* cited by examiner

*Primary Examiner* — Yosef Kassa
(74) *Attorney, Agent, or Firm* — Mark M. Friedman

(57) ABSTRACT

A method for depth-image-based rendering, the method comprising the steps of: obtaining a first reference view; obtaining a depth map for the first reference view; obtaining a second reference view; obtaining a depth map for the second reference view; the method further comprising the steps of extracting noise present in the first and the second reference views; denoising the first and the second reference views and, based on the denoised first and second reference views, rendering an output view using depth-image-based rendering; adding the extracted noise to the output view.

8 Claims, 2 Drawing Sheets

SYSTEM AND A METHOD FOR DEPTH-IMAGE-BASED RENDERING

TECHNICAL FIELD

The present disclosure relates to a system and method for depth-image-based rendering. In particular, the present disclosure relates to management of noise present in images used for virtual view synthesis, in particular in stereoscopic images.

BACKGROUND

Depth-Image-Based Rendering (DIBR) is a technology related to three dimensional video systems. In free viewpoint television (or three-dimensional (3D) video), DIBR is used to generate virtual views based on image and associated depth information. Images used to generate virtual views is called reference views.

DIBR may result in accumulation of noise in the rendered image. During DIBR synthesis, noise present in reference views is projected into the output image. Since the noise of the reference images is not correlated, its presence in different reference views sums up in the rendered output, which increases the noise level of the output image.

Prior art discloses a technique of transmitting multiview images, where noise has been removed. A U.S. Pat. No. 8,643,701 discloses applying first and second depth enhancement before and during view synthesis, to correct errors or suppress noise due to the estimation or acquisition of the dense depth images and sparse depth features. Nevertheless, enhancements before and during view synthesis to correct errors or suppress noise, do not result in the output noise levels, in the output rendered view, being substantially similar to the noise level present in the source, reference image(s).

There is a need to provide an improved method and apparatus for depth-image-based rendering, aiming to improve management of noise present in the base stereo images.

SUMMARY

There is disclosed herein a method for depth-image-based rendering, the method comprising the steps of: obtaining a first reference view; obtaining a depth map for the first reference view; obtaining a second reference view; obtaining a depth map for the second reference view; the method further comprising the steps of: extracting noise present in the first and the second reference views; denoising the first and the second reference views and, based on the denoised first and second reference views, rendering an output view using depth-image-based rendering; adding the extracted noise to the output view.

The noise can be extracted as a difference of denoised reference views and an original unaltered views.

The denoising can be effected by spatial denoising or temporal denoising or spatial-temporal denoising.

The depth map can be obtained together with the respective reference view or generated based on the content of the reference view.

In case the noise in the first and the second reference view is significantly different, a function can be applied to obtain a single noise level.

The step of adding the extracted noise to the output view may comprise the steps of: estimating energy, of extracted noise, in blocks; normalizing, the extracted noise by RMS; modeling the normalized noise by a linear predictive coding method; synthesizing the RMS of the noise using a DIBR technique; generating and modulating white noise with a use of estimated LPC filter, denormalizing the white noise by projected RMS of the extracted noise; adding the created noise to the output view.

There is also disclosed herein a computing device program product for depth-image-based rendering, the computing device program product comprising: a non-transitory computer readable medium; first programmatic instructions for obtaining a first reference view; second programmatic instructions obtaining a depth map for the first reference view; third programmatic instructions obtaining a second reference view; fourth programmatic instructions obtaining a depth map for the second reference view; fifth programmatic instructions extracting noise present in the first and the second reference views; sixth programmatic instructions denoising the first and the second reference views and, based on the denoised first and second reference views, rendering an output view using depth-image-based rendering; seventh programmatic instructions adding the extracted noise to the output view.

There is also disclosed herein a system for depth-image-based rendering, the system comprising: a data bus communicatively coupling components of the system; a memory for storing data; a noise extractor configured to determine amount of noise present in a reference view; a DBIR module configured to generate an output view based on a reference image and its associated depth information; a noise generator configured to add noise to the output view based on the result of processing by the noise extractor; a controller configured to perform the steps of: obtaining a first reference view; obtaining a depth map for the first reference view; obtaining a second reference view; obtaining a depth map for the second reference view; extracting noise present in the first and the second reference views; denoising the first and the second reference views and, based on the denoised first and second reference views, rendering an output view using depth-image-based rendering; adding the extracted noise to the output view.

BRIEF DESCRIPTION OF DRAWINGS

These and other objects presented herein are accomplished by providing a system and method for depth-image-based rendering. Further details and features of the presented method and system, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DETAILED DESCRIPTION

The presented method and system are generally based on a process, wherein a virtual image is synthesized from denoised reference views/images and wherein there is subsequently added noise to the final, rendered image. Thus, the amount of noise and its characteristics is substantially the same in a reference view and in the final, rendered view.

Terms such as "denoising" or "noise reduction" as used herein are meant as a process of removing noise from a video signal or an image. Video denoising methods can be divided into: (a) spatial video denoising methods, where image noise reduction is applied to each frame individually; (b) temporal video denoising methods, where noise between frames is reduced; (c) spatial-temporal video denoising methods that use a combination of spatial and temporal denoising. Denoising methods may also be designed and tuned for specific types of noise depending on needs.

Figure 1:
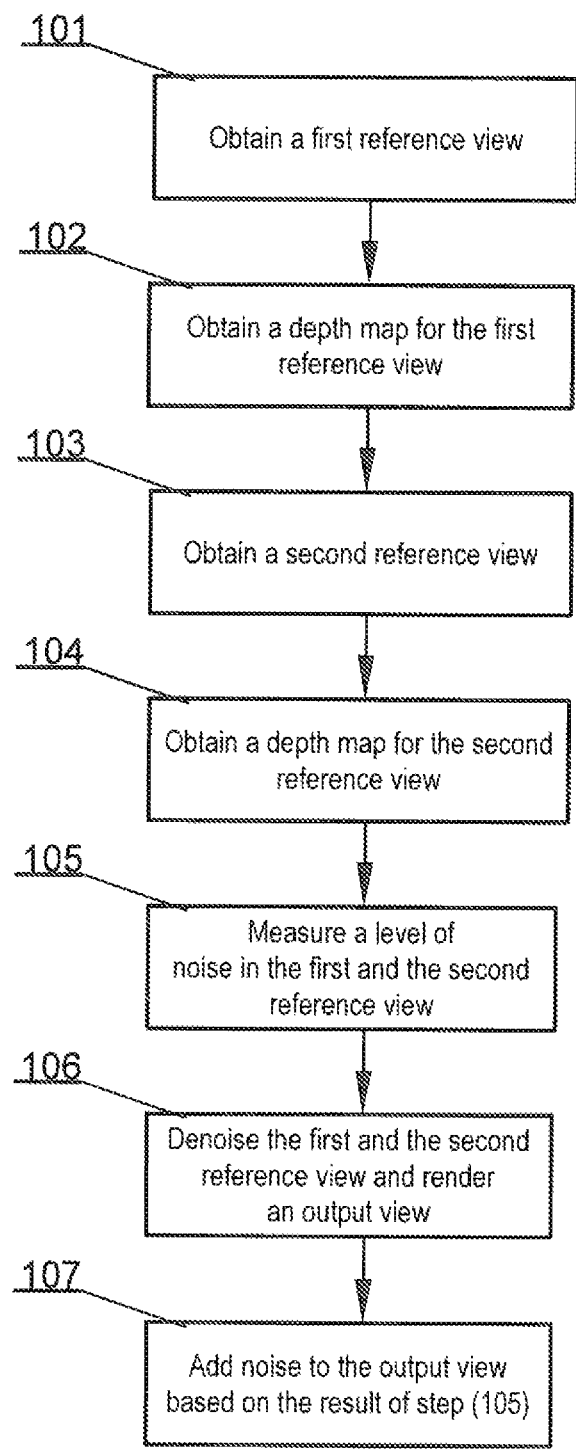
FIG. 1 presents a diagram of the method for depth-based image rendering.

FIG. 1 presents a diagram of the method for depth-based image rendering. The method starts at step (101) from obtaining a first reference view (i.e. a digital image or a stereoscopic pair of images). Subsequently, at step (102), there is obtained a depth map for the first reference view. The depth map may be received together with the first reference view or generated based on the content of the view (the depth map may be created from a pair of stereo images).

Similarly, at step (103), there is obtained a second reference view. Subsequently, at step (104), there is obtained a depth map for the second reference view. The depth map may be received together with the first reference view or generated based on the content of the view (the depth map may be created from a pair of stereo images).

Next, at step (105), a noise present in reference views is extracted. This may also require to create, in advance, denoised images when noise is extracted as a difference of denoised reference image(s) and an original unaltered image(s). Additionally, extracted noise may be stored in memory for further use.

A level of noise in the first and the second reference view is measured. In case the noise in the first and the second reference view is significantly different, a function may be applied to obtain a single noise level e.g. average noise between the images or a function giving weights to the first and second reference views depending on the noise type as well as the noise level.

Subsequently, at step (106), the first and the second reference views are denoised and based on the denoised first and second reference views an output view is rendered.

An example of denoising process that may be applied, is described in: "A High-Quality Video Denoising Algorithm based on Reliable Motion Estimation" by Ce Liu, William T. Freeman; Microsoft Research New England; Massachusetts Institute of Technology".

For example, the output view can be synthesized by using one of the methods described in the following publications:

"On New View Synthesis Using Multiview Stereo" by O. J. Woodford, I. D. Reid, P. H. S. Torr, A. W. Fitzgibbon; In Proc. BMVC; 2007; pp. 1120-1129

Vision, Modeling, and Visualization (2010); Reinhard Koch, Andreas Kolb, Christof Rezk-Salama (Eds.);

"Adaptive Image-space Stereo View Synthesis" by P. Didyk, T. Ritschel, E. Eisemann, K. Myszkowski, H. Seidel, Vision, Modeling and Visualization Workshop, Siegen, Germany, 2010, pp. 299-306;

Marek Domański, Mateusz Gotfryd, Krzysztof Wegner, "View synthesis for multiview video transmission", The 2009 International Conference on Image Processing, Computer Vision, and Pattern Recognition, Las Vegas, USA, 13-16 Jul. 2009.

Next, at step (107), noise is added to the output view based on the result of step (105).

The addition of noise may be executed as follows. Energy of extracted noise from reference views is estimated in blocks. Then, the extracted noise in normalized by RMS (Root Mean Square). The normalized noise is modeled by a linear predictive coding method such as 2D-LPC (or 2 1D-LPC), for example as described in "High Efficiency 3D Video Coding Using New Tools Based on View Synthesis", chapter VI (Domanski, M.; Stankiewicz, O.; Wegner, K.; Kurc, M.; Konieczny, J.; Siast, J.; Stankowski, J.; Ratajczak, R.; Grajek, T., Image Processing, IEEE Transactions on (Volume: 22, Issue: 9, 2013), pp. 3517-3527). This results in spatial characteristic model of the noise. Then the RMS of the noise is synthesized using a DIBR technique. White noise is generated and modulated with a use of estimated 2D-LPC filter. Then it is denormalized by projected RMS of the extracted noise. Such created noise is added to the created virtual view.

Another option, for addition of noise, is when one of the extracted noise of the reference view is projected with help of DIBR technique onto virtual view position. There is executed creating noise image to be added to created virtual view.

Figure 2:
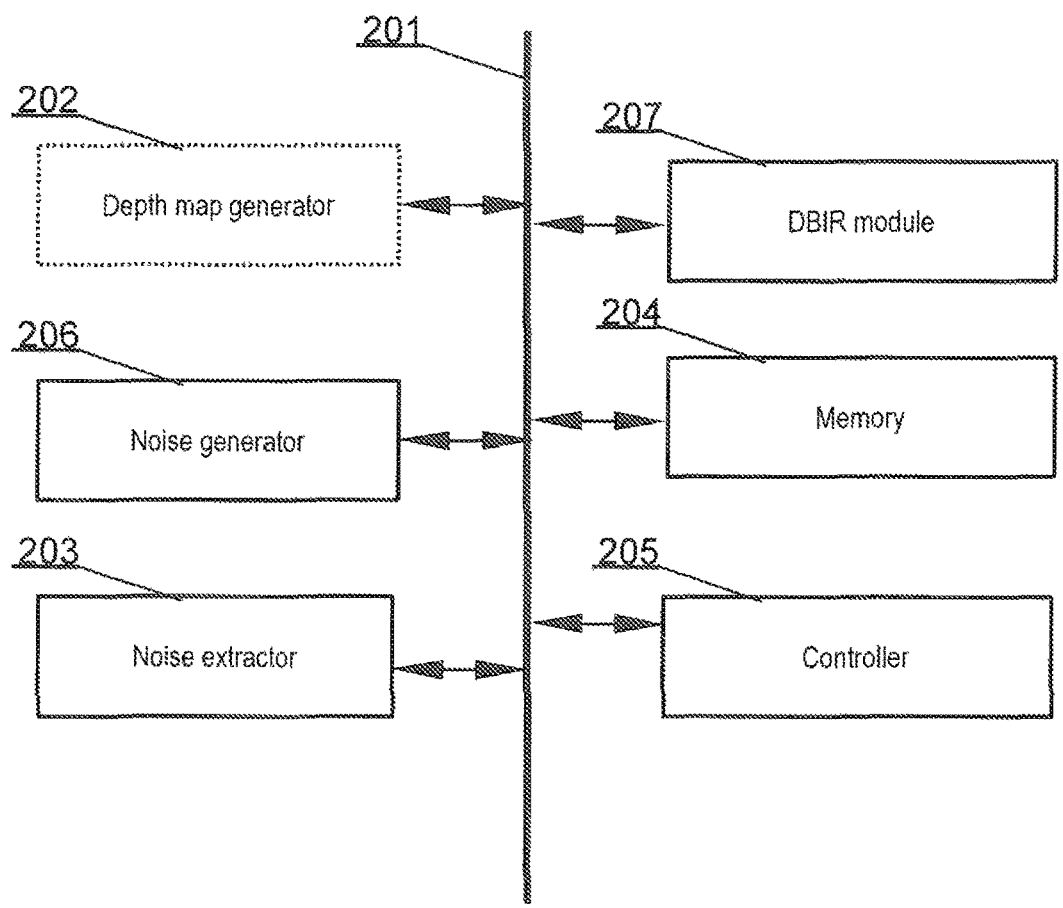
FIG. 2 presents a diagram of the system for depth-based image rendering.

FIG. 2 presents a diagram of the system for depth-based image rendering. The system may be realized using dedicated components or custom made FPGA or ASIC circuits.

The system comprises a data bus (201) communicatively coupled to a memory (204). Additionally, other components of the system are communicatively coupled to the system bus (201) so that they may be managed by a controller (205).

The memory (204) may store computer program or programs executed by the controller (205) in order to execute steps of the method for depth-based image rendering. Further, the memory (204) may store any temporary data necessary to arrive at the final result of the method for depth-based image rendering.

A depth map generator (202) may optionally be present in case the reference image(s) do not have an associated depth map. Such generator may operate according to known methods such as: "Depth Map Generation From a Monoscopic Image Based on Combined Depth Cues" US 20140118494 A1; "System and method for efficiently performing a depth map recovery procedure" U.S. Pat. No. 7,333,652B2.

Further, the system comprises a noise extractor (or noise modeler) (203) configured to determine amount of noise present in a reference image. Such detector may operate according to one or more known methods such as: "Image noise detection" EP 1309185 A1; "Method and system for noise level detection in image data" U.S. Pat. No. 8,208,753 B2. Such noise detection may be run over the entire image to give a single score/value as a result or be run over portions of such image in order to result in different noise scores/values associated with different portions of such image.

A further module of the system is a DBIR module (207) configured to generate virtual views based on a reference image and its associated depth information as previously explained.

The last module of the system is a noise generator (206) configured to add noise to the output view based on the result of processing by the noise extractor (203). An output image/view thus obtained may be stored in the memory (204).

The present method provides improved quality of DIBR as well as output noise levels substantially similar to the noise level present in the source, reference image(s). Therefore, the method and system provide a useful, concrete and tangible result.

According to the presented method and system, certain computer data are processed in a processing device according to FIG. 2. Therefore, the machine or transformation test is fulfilled and that the idea is not abstract.

It can be easily recognized, by one skilled in the art, that the aforementioned method for depth-image-based rendering may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the method and system presented herein has been depicted, described, and has been defined with reference to particular preferred embodiments, such references and examples of implementation in the foregoing specification do not imply any limitation on the method or system. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for depth-image-based rendering, the method comprising the steps of:
    obtaining a first reference view;
    obtaining a depth map for the first reference view;
    obtaining a second reference view;
    obtaining a depth map for the second reference view;
    extracting noise present in the first and the second reference views;
    denoising the first and the second reference views and, based on the denoised first and second reference views, rendering an output view using depth-image-based rendering;
    adding the extracted noise to the output view.

2. The method according to claim 1, wherein the noise is extracted as a difference of denoised reference views and an original unaltered views.

3. The method according to claim 1, wherein denoising is effected by spatial denoising or temporal denoising or spatial-temporal denoising.

4. The method according to claim 1, wherein the depth map is obtained together with the respective reference view or generated based on the content of the reference view.

5. The method according to claim 1, wherein in case the noise in the first and the second reference view is significantly different, a function is applied to obtain a single noise level.

6. The method according to claim 1, wherein the step of adding the extracted noise to the output view comprises the steps of:
    estimating energy, of extracted noise, in blocks;
    normalizing, the extracted noise by RMS;
    modeling the normalized noise using a linear predictive coding method;
    synthesizing the RMS of the noise using a DIBR technique;
    generating and modulating white noise with a use of estimated LPC filter;
    denormalizing the white noise by projected RMS of the extracted noise;
    adding the created noise to the output view.

7. A computing device program product for depth-image-based rendering, the computing device program product comprising:
    a non-transitory computer readable medium;
    first programmatic instructions for obtaining a first reference view;
    second programmatic instructions obtaining a depth map for the first reference view;
    third programmatic instructions obtaining a second reference view;
    fourth programmatic instructions obtaining a depth map for the second reference view;
    fifth programmatic instructions extracting noise present in the first and the second reference views;
    sixth programmatic instructions denoising the first and the second reference views and, based on the denoised first and second reference views, rendering an output view using depth-image-based rendering;
    seventh programmatic instructions adding the extracted noise to the output view.

8. A system for depth-image-based rendering, the system comprising:
    a data bus communicatively coupling components of the system;

a memory for storing data;
a noise extractor configured to determine amount of noise present in a reference view;
a DBIR module configured to generate an output view based on a reference image and its associated depth information;
a noise generator configured to add noise to the output view based on the result of processing by the noise extractor;
a controller configured to perform the steps of:
   obtaining a first reference view;
   obtaining a depth map for the first reference view;
   obtaining a second reference view;
   obtaining a depth map for the second reference view;
   extracting noise present in the first and the second reference views;
   denoising the first and the second reference views and, based on the denoised first and second reference views, rendering an output view using depth-image-based rendering;
   adding the extracted noise to the output view.

\* \* \* \* \*